(12) United States Patent
Nishijima

(10) Patent No.: US 7,119,507 B2
(45) Date of Patent: Oct. 10, 2006

(54) BRUSHLESS DC MOTOR AND BRUSHLESS DC MOTOR CONTROLLER

(75) Inventor: Kiyotaka Nishijima, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/536,305

(22) PCT Filed: Nov. 28, 2003

(86) PCT No.: PCT/JP03/15203

§ 371 (c)(1),
(2), (4) Date: May 26, 2005

(87) PCT Pub. No.: WO2004/049541

PCT Pub. Date: Jun. 10, 2004

(65) Prior Publication Data

US 2006/0119299 A1   Jun. 8, 2006

(30) Foreign Application Priority Data

Nov. 28, 2002   (JP) .............................. 2002-345980

(51) Int. Cl.
*H02P 1/18* (2006.01)
(52) U.S. Cl. ...................... 318/254; 318/439; 318/138; 318/629; 318/632; 310/156.15
(58) Field of Classification Search ................ 318/254, 318/138, 439, 629, 632; 310/51, 156.15
See application file for complete search history.

(56) References Cited

U.S. PATENT DOCUMENTS

| 5,386,161 | A | * | 1/1995 | Sakamoto ................. 310/49 R |
| 5,804,904 | A | * | 9/1998 | Park et al. ................... 310/261 |
| 6,008,559 | A | | 12/1999 | Asano et al. |
| 6,069,428 | A | * | 5/2000 | Nelson ......................... 310/90 |
| 6,218,753 | B1 | | 4/2001 | Asano et al. |
| 6,498,451 | B1 | * | 12/2002 | Boules et al. ................ 318/661 |
| 6,770,992 | B1 | * | 8/2004 | Yamauchi et al. .......... 310/90.5 |

FOREIGN PATENT DOCUMENTS

| EP | 1289101 A | 3/2003 |
| JP | 11-98731 A | 4/1999 |
| JP | 3028669 B | 2/2000 |
| JP | 2000-217287 A | 8/2000 |
| JP | 2001-231196 A | 8/2001 |
| JP | 2001-268873 A | 9/2001 |
| JP | 2002-44888 A | 2/2002 |

* cited by examiner

*Primary Examiner*—Rina Duda
(74) *Attorney, Agent, or Firm*—Global IP Counselors

(57) ABSTRACT

A brushless DC motor has a stator and a rotor. An angle $\theta_0$ between an edge section of the flux barrier on a magnetic pole center side and an edge section on a side for coming in contact with the rib of adjacent flux barrier, with respect to the rotor center, is determined to be equal to or greater than an angle satisfying a following relationship $$\theta_0 = 180° * m/(Pn * f/f_0) \text{ (provided } 2\theta_0 - \theta_r < 90°\text{)}$$

wherein, a frequency of vibration which is to be reduced is represented with f, a pole pair number is represented with Pn, an electrical frequency is represented with $f_0 = Pn * N$, a motor revolution is represented with N, m=1, 3, 5, . . . , an angle of the rib with respect to the rotor center is represented with $\theta_r$, therefore making of motor highly effective and decreasing of the motor acoustic noise are coped with.

14 Claims, 8 Drawing Sheets revolution angle of a rotor (mechanical angle) [deg]

tb [mm] (thickness of a bridge)

BRUSHLESS DC MOTOR AND BRUSHLESS DC MOTOR CONTROLLER

CROSS-REFERENCE TO RELATED APPLICATIONS

This nonprovisional application claims priority under 35 U.S.C. § 119(a) to Japanese Patent Application No. 2002-345980, filed in Japan on Nov. 28, 2002, the entire content of which is hereby incorporated by reference.

TECHNICAL FIELD

The present invention relates to a brushless DC motor and brushless DC motor control apparatus. More particularly, the present invention relates to a novel brushless DC motor and brushless DC motor control apparatus which can cope with both making of motor highly effective and decreasing of the motor acoustic noise.

RELATED ART

From the past, it was proposed that a dimension in peripheral direction of a flux barrier is determined to be equal to or greater than a thickness of a magnet so as to improve efficiency (refer to Japanese Patent Laid-open Gazette No. Tokukai 2002-44888).

It is also proposed that decreasing of the motor acoustic noise is intended to be realized by an angle of a flux barrier, for a brushless DC motor in which permanent magnets are embedded in an interior of a rotor (hereinafter, referred to as IPM) (refer to Japanese Patent Laid-open Gazette No. Tokukaihei 11-98731, and Japanese Patent Laid-open Gazette No. Tokukai 2000-217287).

It is also proposed that applying skew in a piled direction of a rotor for IPM (Japanese Patent No. 3028669).

For a motor having a pole pair number of Pn, and for a frequency which is Pn times of a motor revolution (rps) (hereinafter, referred to as a fundamental frequency), an electro-magnetic suction force (hereinafter, also referred to as an electro-magnetic exciting force) is generated between a rotor and teeth of a stator at a frequency which is an integer times of the fundamental frequency (hereinafter, the multiplying factor is referred to as an order), therefore vibration/noise of a frequency corresponding to the order is generated.

When the vibration of the frequency corresponding to the order is coincident with a characteristic frequency of a motor, a frame for supporting a motor and the like, the vibration/noise is increased due to the resonance, and may become a subject of discussion.

When an electro-magnetic suction force working between a rotor and a stator during revolution is decomposed into a first component in a tangential direction (circumferential direction) and a second component in a normal direction (radial direction), the tangential component is effectively utilized as a revolution force, but the normal component is useless electro-magnetic suction force which generate only the subject of discussion for vibration/noise. And, the normal component is greater than the tangential component by about 1 digit. It is effective for the use which is required smoothness in generates torque of a motor that cogging torque or torque ripple during driving is reduced by a conventional manner or skew. But, it is required for the demand for reducing vibration/noise of a motor and an entirety of an apparatus in which a motor is incorporated that an electro-magnetic exciting force in the normal direction is reduced which is useless and is a great electro-magnetic force.

To reduce the electro-magnetic exciting force in the normal direction, it is preferable that the dimension of the exciting force itself is reduced. But, in many cases, such coping is difficult to be employed by taking disadvantages into consideration that lowering in motor efficiency and the like. Therefore, it is desired to cope with motor driving apparatus for reducing vibration/noise of a specific order (a frequency obtained by multiplying an integer with a revolution) which is a subject of discussion.

There exist the disadvantages in the following points for the above prior arts.

In the Japanese Patent Laid-open Gazette No. Tokukai 2002-44888, improvement in efficiency is realized by determining an angle of a magnetic pole core to be a suitable value. But, when a motor with high efficiency and low noise is desired, and when a noise of a specific order is to be reduced for decreasing of the motor acoustic noise, it is not coped with both the making of motor highly effective and decreasing of the motor acoustic noise, for every angle within an extent where the improvement in efficiency is realized. Therefore, the most proper angle should be selected and determined within the extent. Such determination cannot easily be realized for even a person having an ordinary skill in the art.

Further, affection due to variation in a length of rib width is not taken into consideration in the Japanese Patent Laid-open Gazette No. Tokukai 2002-44888, it is further difficult that both the making of motor highly effective and the decreasing of the motor acoustic noise are coped with. Description is made further.

A rib is a portion extending in a radial direction for connecting a core and a bridge, the core being an interior of a rotor, the interior being on inner side with respect to a magnet. Increasing the length of the rib width causes increasing in a q-axis inductance Lq. Torque Trq is represented with the equation of $$Trq = Pn*(\phi a * iq + (Ld-Lq)*id*iq)$$

Wherein, Pn represents a pole pair number, id and iq represent d-axis current and q-axis current, respectively, Ld and Lq represent d-axis inductance and q-axis inductance, respectively, and ($\phi$a represents a flux linkage.

When Lq can be made greater, an absolute value of (Ld−Lq) can be made greater, consequently reluctance torque can be increased. The rib width dimension and the shape of the flux barrier section adjacent to the rib are greatly related to the generation mechanism of the electro-magnetic exciting force. But, the Japanese Patent Laid-open Gazette No. Tokukai 2002-44888 cannot take affection into consideration, the affection being due to varying in the width dimension of the rib.

In the Japanese Patent Laid-open Gazette No. Tokukaihei 11-98731, determination of an angle between leading edges of barriers each including a rib, or determination of an angle from the center of the rib as the standard to the leading edge of the barrier, for the purpose of lowering in torque ripple, is disclosed. But, the determined angle is kept as it is despite of varying in the length of the rib width. That is, the rib width dimension and the shape of the flux barrier section adjacent to the rib are greatly related to the generation mechanism of the electro-magnetic exciting force, as is described above. Therefore, in the Japanese Patent Laid-open Gazette No. Tokukaihei 11-98731, it is not possible that both the making of motor highly effective and the decreasing of the motor acoustic noise are coped with.

In the Japanese Patent Laid-open Gazette No. Tokukai 2000-217287, regulation of an extent of an angle of a magnetic pole for the purpose of lowering in torque ripple. Similarly to the above, varying in a length of a rib width is not recited at all. That is, the length of the rib width and the shape of the flux barrier section adjacent to the rib are greatly related to the generation mechanism of the electromagnetic exciting force, as is described above. Therefore, in the Japanese Patent Laid-open Gazette No. Tokukai 2000-217287, it is not possible that both the making of motor highly effective and the decreasing of the motor acoustic noise are coped with.

Further, in IPM, bridge sections each having a thin section thickness are provided for the purpose of maintaining rotor cores in one body and taking productivity into consideration, on purpose of short-circuit in magnetic flux. This does not consider affection due to the existence of the bridge section, although the bridge section is made as thin as possible and the short-circuit in magnetic flux is suppressed to the utmost, and although the bridge section is required to have a thickness greater than a certain thickness based upon the necessity of centrifugal strength. Therefore, it is not possible that both the making of motor highly effective and the decreasing of the motor acoustic noise are coped with.

SUMMARY OF THE INVENTION

The present invention was made in view of the above problems.

It is an object of the present invention to provide a brushless DC motor and brushless DC motor control apparatus which can easily cope with making of motor highly effective and the decreasing of the motor acoustic noise.

A brushless DC motor of a first aspect according to the present invention comprises a rotor, the rotor comprises plural permanent magnets each having a predetermined thickness and being mounted in the interior of the rotor, flux barrier made of non-magnetic section, beginning from an edge section in circumferential direction of each permanent magnet, extending up to vicinity in the surface of the rotor, and having a length in circumferential direction which is greater than the thickness of the permanent magnet, and a rib which is disposed between magnetic poles, the brushless DC motor is characterized in that an angle $\theta_0$ between an edge section of the flux barrier on magnetic pole center side and an edge section on a side for coming in contact with the rib of adjacent flux barrier, with respect to the rotor center, is determined to satisfy the relation of $$\theta_0 = 180° * m/(Pn*f/f_0) \text{ (provided } 2\theta_0 - \theta_r < 90°) \quad \text{(equation 1)}$$

Wherein, a frequency of vibration which is to be reduced is represented with f, a pole pair number is represented with Pn, an electrical frequency is represented with $f_0 = Pn*N$, a motor revolution is represented with N, m=1, 3, 5, . . . , an angle of the rib with respect to the rotor center is represented with $\theta_r$.

A brushless DC motor of a second aspect according to the present invention comprises a rotor, the rotor comprises plural permanent magnets each having a predetermined thickness and being mounted in the interior of the rotor, flux barrier made of non-magnetic section, beginning from an edge section in circumferential direction of each permanent magnet, extending up to vicinity in the surface of the rotor, and having a length in circumferential direction which is greater than the thickness of the permanent magnet, and a rib which is disposed between magnetic poles, the brushless DC motor is characterized in that an angle $\theta_0$ between an edge section of the flux barrier on magnetic pole center side and an edge section on a side for coming in contact with the rib of adjacent flux barrier, with respect to the rotor center, is determined to be greater than the angle satisfying the relationship of the equation 1 in correspondence with the thickness of the bridge.

A brushless DC motor of a third aspect according to the present invention determines the frequency f so that $f/f_0$ is an even number.

A brushless DC motor of a fourth aspect according to the present invention determines the frequency f so that $f/f_0$ corresponds to multiplication of an integer and (stator slot number/Pn).

A brushless DC motor of a fifth aspect according to the present invention determines m so that the angle $\theta_0$ is equal to or greater than $(30/Pn)°$ and equal to or less than $(60/Pn)°$ in equation 1.

A brushless DC motor of a sixth aspect according to the present invention determines the width of the rib to be equal to or greater than twice of the thickness of the bridge.

A brushless DC motor of a seventh aspect according to the present invention further comprises a reinforcement bridge for reinforcing the bridge.

In a brushless DC motor of an eighth aspect according to the present invention, the flux barrier has a shape on its magnetic pole center side, the shape being decreasing gradually in a radial direction, and an angle $\theta_b$ of the radial direction gradually decreasing shaped section is determined to be equal to or greater than 18° and equal to or less than 25°.

A brushless DC motor of a ninth aspect according to the present invention determines the stator slot number to be 36, the pole pair number Pn to be 2, $f/f_0$ to be 36, m in the equation 1 to be 7, respectively.

A brushless DC motor of a tenth aspect according to the present invention employs a rotor applied skew as the rotor.

A brushless DC motor of an eleventh aspect according to the present invention employs a stator applied distributed winding as the stator.

A brushless DC motor control apparatus of a twelfth aspect according to the present invention comprises an inverter device which is controlled to advance a current phase with respect to an induction voltage of the brushless DC motor of one of the first to eleventh aspect.

A brushless DC motor control apparatus of a thirteenth aspect according to the present invention determines a motor terminal voltage at the maximum revolution to be equal to or greater than a voltage of the inverter.

A brushless DC motor control apparatus of a fourteenth aspect according to the present invention comprises a control section which calculates a rotor position using a voltage applied to the motor, a motor current, and equipment constants of the motor, and controls the inverter device based upon the calculated rotor position for controlling a motor driving current or a voltage applied to the motor.

A brushless DC motor control apparatus of a fifteenth aspect according to the present invention employs a brushless DC motor driving a compressor as the brushless DC motor.

The brushless DC motor of a first aspect according to the present invention comprises the rotor, the rotor comprises plural permanent magnets each having the predetermined thickness and being mounted in the interior of the rotor, flux barrier made of non-magnetic section, beginning from the edge section in circumferential direction of each permanent magnet, extending up to vicinity in the surface of the rotor, and having the length in circumferential direction which is greater than the thickness of the permanent magnet, and the rib which is disposed between magnetic poles, and the brushless DC motor determines the angle $\theta_0$ between the edge section of the flux barrier on magnetic pole center side and the edge section on the side for coming in contact with the rib of adjacent flux barrier, with respect to the rotor center, to satisfy the relation of the equation 1. Therefore the brushless DC motor realizes making of motor highly effective, and realizes decreasing of the motor acoustic noise by decreasing vibration at the frequency f.

The brushless DC motor of the second aspect according to the present invention comprises the rotor, the rotor comprises plural permanent magnets each having the predetermined thickness and being mounted in the interior of the rotor, flux barrier made of non-magnetic section, beginning from the edge section in circumferential direction of each permanent magnet, extending up to vicinity in the surface of the rotor, and having the length in circumferential direction which is greater than the thickness of the permanent magnet, and the rib which is disposed between magnetic poles, the brushless DC motor determines the angle $\theta_0$ between the edge section of the flux barrier on magnetic pole center side and the edge section on the side for coming in contact with the rib of adjacent flux barrier, with respect to the rotor center, to be greater than the angle satisfying the relationship of the equation 1 in correspondence with the thickness of the bridge. Therefore the brushless DC motor realizes making of motor highly effective by taking the thickness of the bridge into consideration, and realizes decreasing of the motor acoustic noise by decreasing vibration at the frequency f.

The brushless DC motor of the third aspect according to the present invention determines the frequency f so that $f/f_0$ is an even number. Therefore, operations and effects similar to those of the first aspect or the second aspect are realized.

The brushless DC motor of the fourth aspect according to the present invention determines the frequency f so that $f/f_0$ corresponds to multiplication of an integer and (stator slot number/Pn). Therefore, operations and effects similar to those of the first aspect or the second aspect are realized.

The brushless DC motor of the fifth aspect according to the present invention determines m so that the angle $\theta_0$ is equal to or greater than $(30/Pn)°$ and equal to or less than $(60/Pn)°$ in equation 1. Therefore, operations and effects similar to those of one of the first aspect through the fourth aspect are realized.

The brushless DC motor of the sixth aspect according to the present invention determines the width of the rib to be equal to or greater than twice of the thickness of the bridge. Therefore, operations and effects similar to those of one of the first aspect through the fifth aspect are realized.

The brushless DC motor of the seventh aspect according to the present invention further comprises a reinforcement bridge for reinforcing the bridge. Therefore, mechanical strength is improved, and operations and effects similar to those of one of the first aspect through the sixth aspect are realized.

In the brushless DC motor of the eighth aspect according to the present invention, the flux barrier has the shape on its magnetic pole center side, the shape being decreasing gradually in a radial direction, and the angle $\theta_b$ of the radial direction gradually decreasing shaped section is determined to be equal to or greater than 18° and equal to or less than 25°. Therefore, exciting force and torque ripple can be made smaller, and operations and effects similar to those of one of the first aspect through the seventh aspect are realized.

The brushless DC motor of the ninth aspect according to the present invention determines the stator slot number to be 36, the pole pair number Pn to be 2, $f/f_0$ to be 36, m in the equation 1 to be 7, respectively. Therefore, operations and effects similar to those of one of the first aspect, the second aspect, the sixth aspect, the seventh aspect, and the eighth aspect are realized.

The brushless DC motor of the tenth aspect according to the present invention employs the rotor applied skew as the rotor. Therefore, torque ripple is reduced, and operations and effects similar to those of one of the first aspect through the ninth aspect are realized.

The brushless DC motor of the eleventh aspect according to the present invention employs the stator applied distributed winding as the stator. Therefore, vibration is reduced, and operations and effects similar to those of one of the first aspect through the tenth aspect are realized.

The brushless DC motor control apparatus of the twelfth aspect according to the present invention comprises the inverter device which is controlled to advance the current phase with respect to the induction voltage of the brushless DC motor of one of the first to eleventh aspect. Therefore, making of motor highly effective is realized, and decreasing of the motor acoustic noise is realized by reducing vibration at the frequency f.

The brushless DC motor control apparatus of the thirteenth aspect according to the present invention determines the motor terminal voltage at the maximum revolution to be equal to or greater than the voltage of the inverter. Therefore, the operating range is enlarged, and operations and effects similar to those of the twelfth aspect are realized.

The brushless DC motor control apparatus of the fourteenth aspect according to the present invention comprises the control section which calculates the rotor position using the voltage applied to the motor, the motor current, and equipment constants of the motor, and controls the inverter device based upon the calculated rotor position for controlling the motor driving current or the voltage applied to the motor. Therefore, the brushless DC motor is controlled without a position sensor, and operations and effects similar to those of the twelfth aspect or the thirteenth aspect are realized.

The brushless DC motor control apparatus of the fifteenth aspect according to the present invention employs the brushless DC motor driving the compressor as the brushless DC motor. Therefore, the compressor is driven without a position sensor, and operations and effects similar to those of the fourteenth aspect are realized.

DETAILED DESCRIPTION OF THE PREFERRED EMBODIMENTS

Hereinafter, referring to the attached drawings, we explain a brushless DC motor and brushless DC motor control apparatus of embodiments according to the present invention, in detail.

First, it is explained how decreasing in noise and an angle $\theta_0$ are determined.

Figure 1:
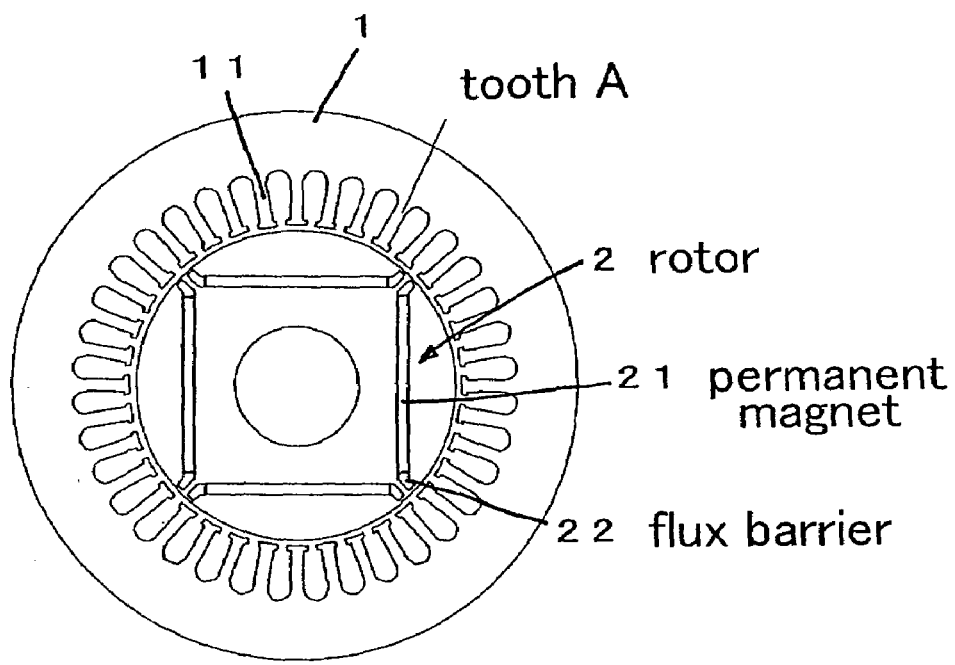
FIG. 1 is a vertical cross sectional view illustrating an arrangement of a conventional brushless DC motor.

FIG. 1 is a vertical cross sectional view illustrating an arrangement of a conventional brushless DC motor. The brushless DC motor comprises a stator 1 which is formed a number of teeth 11, and a rotor 2 which houses permanent magnets 21 in its interior and has barriers for preventing magnetic flux short circuit, each of the barriers extending from an edge section of the permanent magnet 21 towards the outer surface of the rotor.

Figure 2:
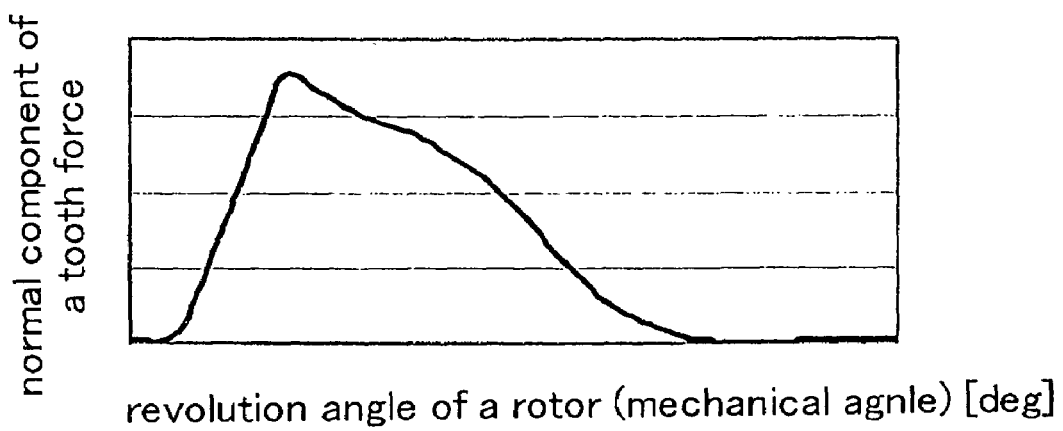
FIG. 2 is a diagram illustrating a normal component of a stator tooth force with respect to a revolution angle of a rotor within the brushless DC motor illustrated in FIG. 1.

FIG. 2 is a diagram illustrating an exciting force (normal component) applied to a tooth A during operation of a brushless DC motor having a rotor which has a width of a barrier 22 which is close to the thickness of the permanent magnet 21.

As is understood from FIG. 2, the exciting force is rapidly increased, then the exciting force is gradually reduced, depending upon the revolution of the rotor 2.

Figure 3:
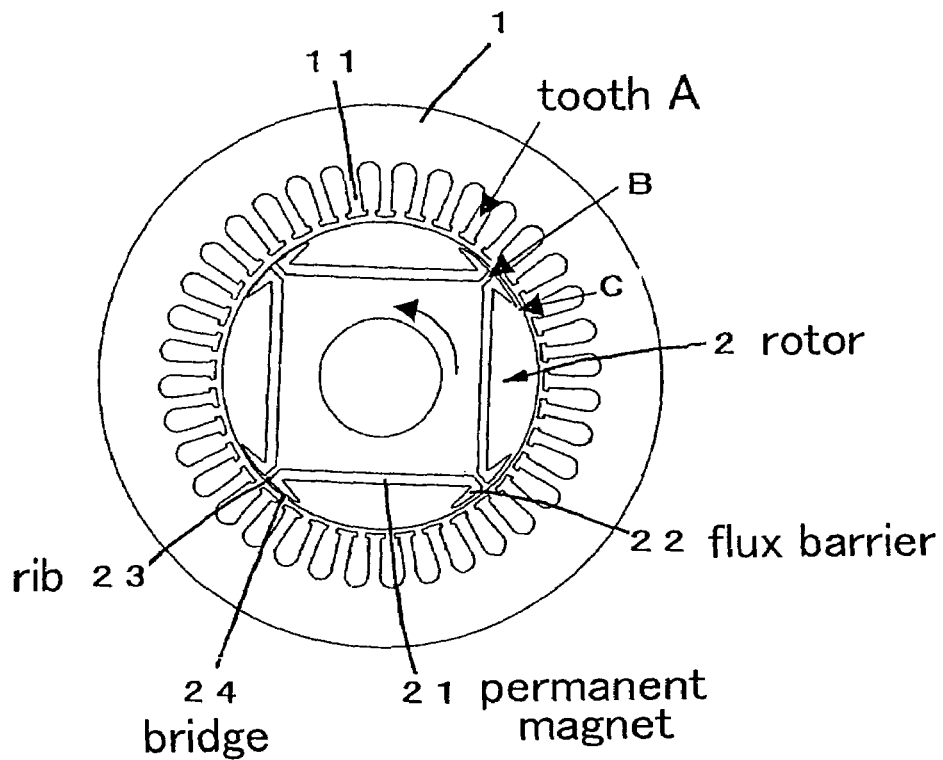
FIG. 3 is a vertical cross sectional view illustrating an arrangement of a brushless DC motor having a rotor which has a width of a barrier greater than a thickness of a permanent magnet.

FIG. 3 is a vertical cross sectional view illustrating an arrangement of a brushless DC motor having a rotor which has a width of a barrier 22 which is greater than the thickness of the permanent magnet 21. It is different from the brushless DC motor illustrated in FIG. 1 only in a shape of the barrier 22.

Figure 4:
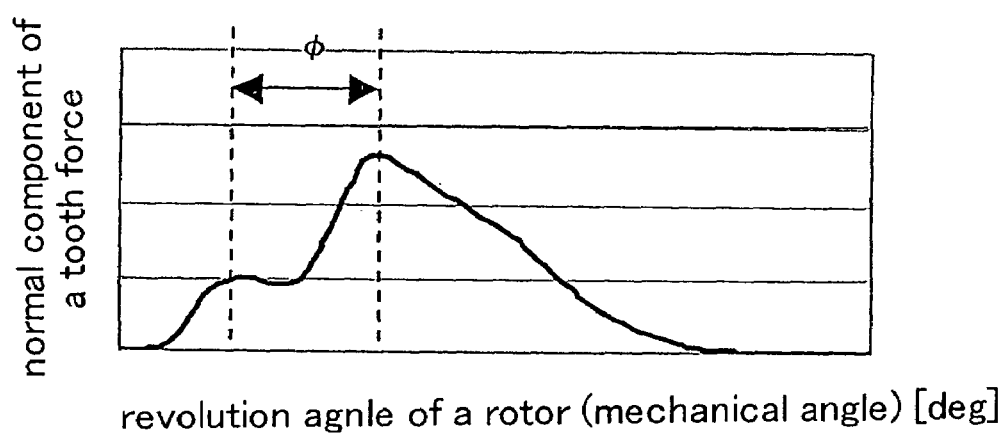
FIG. 4 is a diagram illustrating a normal component of a stator tooth force with respect to a revolution angle of a rotor within the brushless DC motor illustrated in FIG. 3.

FIG. 4 is a diagram illustrating an exciting force (normal component) applied to a tooth A during operation of a brushless DC motor illustrated in FIG. 3.

As is understood from FIG. 4, two crests appear following the revolution of the rotor 2. The first lower crest among the two crests corresponds to the condition where a rib section 23 comes to a position of the tooth A, while the next higher crest corresponds to the condition where a magnetic pole section C at a leading edge of a barrier comes to a position of the tooth A.

Because the crests of the exciting force are generated with a phase difference, exciting force component of a specific frequency can be denied when the phase difference can be determined to be a desired value. Based upon this consideration, it is expected that an angle $\theta_1$ (magnetic pole angle regulated by the barrier 22 corresponding to both edges of the permanent magnet) is properly determined, the angle $\theta_1$ being represented in FIG. 5 which illustrate only the rotor illustrated in FIG. 3 in an enlarged condition.

Providing a frequency of electrical angle to be $f_0$, and when vibration at frequency f is to be reduced, supposing the phase difference φ (electrical angle) in FIG. 4 corresponds to the half cycle at frequency f, the exciting force component at frequency f generated at the first crest and the exciting force component at frequency f generated at the second crest are denied from each other and causes the lowering in vibration being realized.

An angle for one cycle with frequency f becomes $360*f_0/f$ when one cycle with electrical angle fundamental wave frequency $f_0$ is supposed to be 360 degrees.

$$\phi \text{ is half of the angle so that } \phi=180*f_0/f \qquad \text{(equation 2)}.$$

Figure 5:
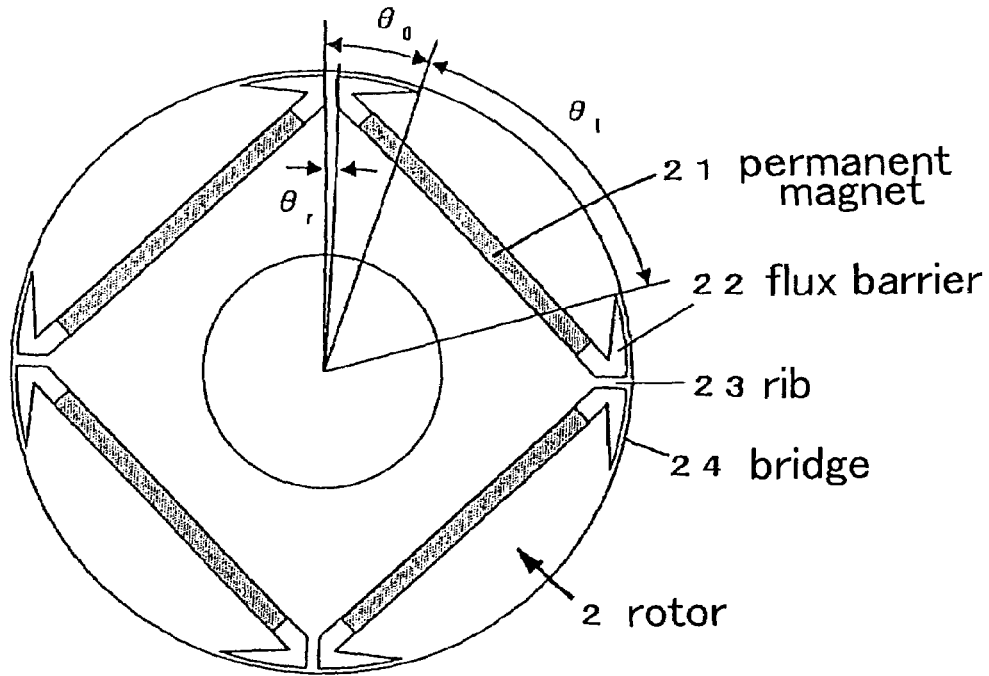
FIG. 5 is a vertical cross sectional view illustrating only a rotor within the brushless DC motor illustrated in FIG. 3 in an enlarged condition.

The phase difference φ is generated within an interval of $\theta_0$ illustrated in FIG. 5 (an angle between the edge section of the flux barrier on magnetic pole center side and the edge section of the neighboring flux barrier on the side contacting the rib with respect to the rotor center). When the pole pair number is supposed to be Pn, the interval $\theta_0$ becomes $$\theta_0=\phi/Pn=180*f_0/f/Pn=180/(Pn*f/f_0) \qquad \text{(equation 3)}.$$

In the foregoing, equation 3 is obtained by determining φ to be a half cycle (0.5 times) of the frequency f. φ is not limited to a half cycle (0.5 times) of the frequency f, but may be 1.5 times, 2.5 times of the frequency f. After all, the angle $\theta_0$ is sufficient to be determined to satisfy $$\theta_0=m*\phi/Pn=180*m*f_0/f/Pn=180*m/(Pn*f/f_0) \qquad \text{(equation 4)}$$

(wherein $2\theta_0-\theta_r<90°$), (m=1, 3, 5, . . . ).

When a way for determining the angle $\theta_0$ as is illustrated in FIG. 5 is employed, as above, the way for determining the angle does not change even when the length of the rib width changes. That is, the way for determining the angle takes the lengthy of the rib width into consideration.

When an angle of the rib 23 with respect to the rotor center is represented with $\theta_r$, $\theta_0$ and $\theta_1$ are in the following relationship of $$\theta_1=(180/Pn)+\theta_r-2*\theta_0 \qquad \text{(equation 5)}.$$

The frequency f aiming for noise reduction may be an arbitrary frequency, may be a frequency which makes $f/f_0$ to be an even number, or may be a frequency which makes $f/f_0$ to be an integer times (stator slot number/Pn).

When the brushless DC motor having the above arrangement is employed, making of motor highly effective and decreasing of the motor acoustic noise can be coped with.

Next, the affection due to the thickness of the bridge and the correction of the angle $\theta_0$ are described.

A bridge 24 having a radial thickness which is equal to or greater than a certain dimension is required for a rotor of a brushless DC motor. Due to the existence of the bridge, $\theta_0$ determined as above is not the best suited for the reduction of noise at the specific frequency f.

Figure 6:
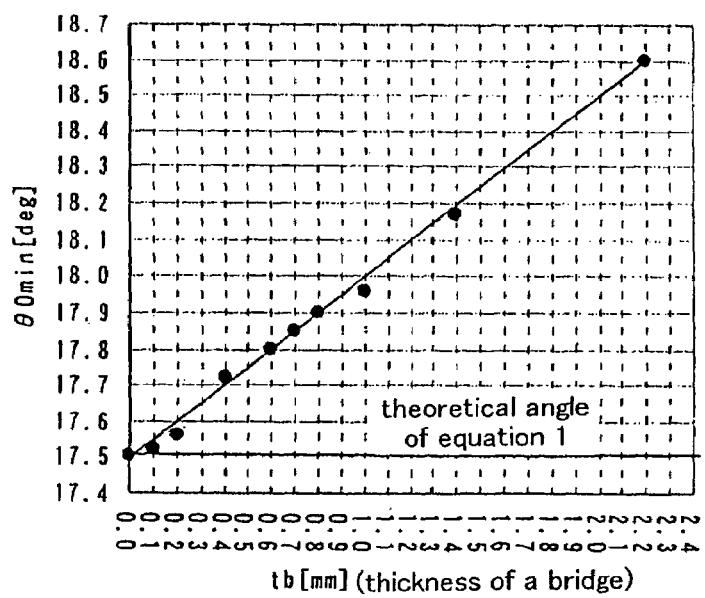
FIG. 6 is a diagram illustrating $\theta_0$ minimizing normal component of a stator tooth force of a stator with respect to a thickness in radial direction of a bridge.

For example, when the angle $\theta_0$ determined by the equation 1 for reducing noise at frequency f is 17.5°, and when the bridge is changes its radial thickness, and when $\theta_0$ for minimizing the stator tooth force normal component of the stator is plotted, $\theta_0$ increases following increase in radial thickness of the bridge 24, as is illustrated in FIG. 6. Specifically, it is understood that $\theta_0$ obtained by equation 1 should be determined to be greater by 0.35°, for the bridge thickness of about 0.7 mm. Although, this is a slight angle, affection is great when the frequency for reduction is high.

For example, f/f$_0$ is 36, an angle for one cycle of frequency f is 5°. 0.35° corresponds to 25 for 36th order frequency. When it is supposed that the exciting force changes with respect to the angle in a sine wave shape, the exciting force difference corresponds to about 10 percent so that affection is great.

Therefore, by holding the relationship illustrated in FIG. 6 as a formula (or equation), or as a table, and by correcting θ$_0$ obtained using equation 1, making of motor highly effective and decreasing of the motor acoustic noise are coped with.

Description is made further.

Figure 7:
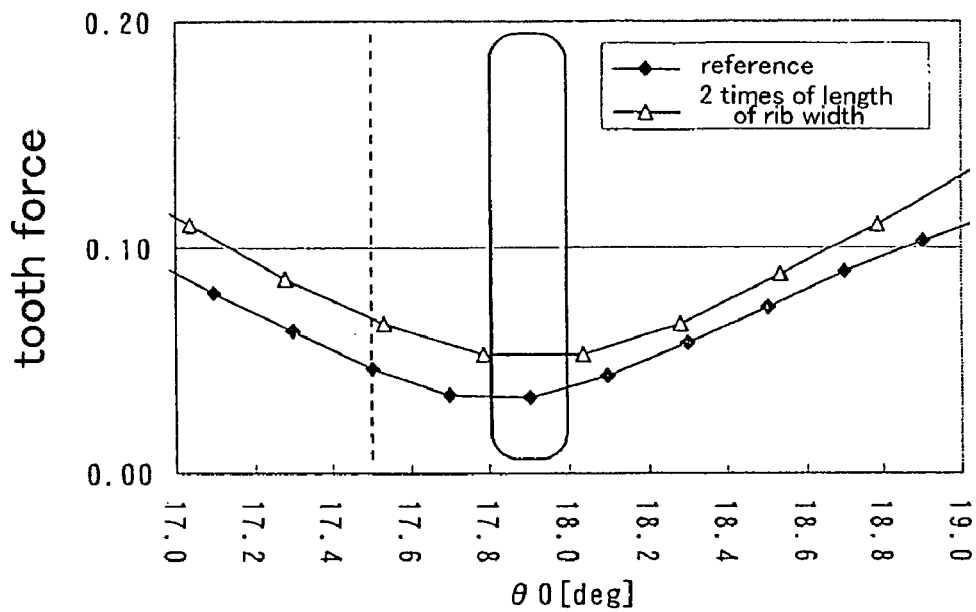
FIG. 7 is a diagram illustrating an analysis example of a stator tooth force with respect to $\theta_0$.

In the above embodiment, even when the rib width changes, the best suited angle can be calculated by calculating θ$_0$ using equation 1 and by correcting the calculated θ$_0$. Specifically, when the slot number is 36, the number of motor poles is 4 poles, the order for reduction is f/f$_0$=36, m=7, the angle obtained by equation 1 is 17.5°. In actual, the exciting force of 36f becomes minimum for the angle θ$_0$ which is corrected to be greater by some degree. Further, even when the length of the rib width has changed, the best suited angle θ$_0$ is not affected (refer to FIG. 7). Wherein, the bridge thickness is determined to be 0.7 mm.

Figure 8:
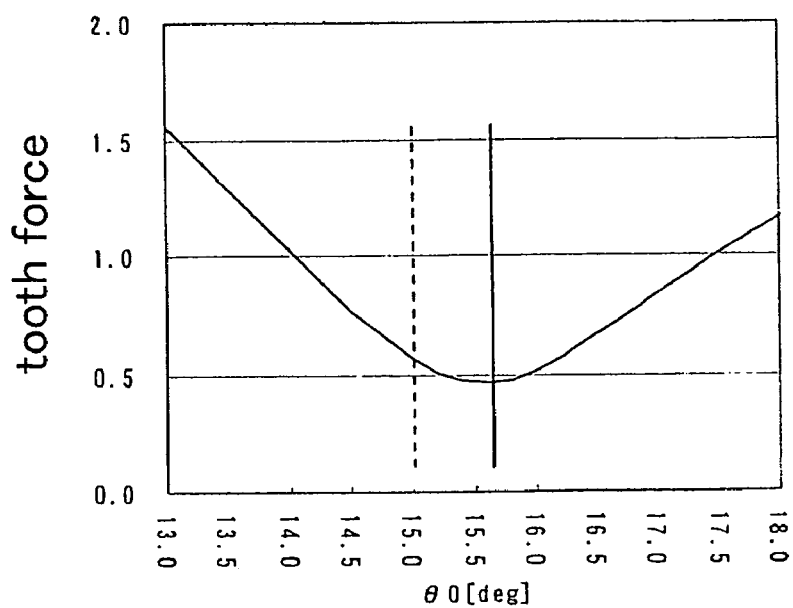
FIG. 8 is a diagram illustrating another example of a stator tooth force with respect to θ₀.

When the slot number is 36, the number of motor poles is 4 poles, the order for reduction is f/f$_0$=18, m=3, it is preferable that the angle is made greater by a small amount than the angle 15° obtained by equation 1 (refer to FIG. 8). Wherein, the bridge thickness is determined to be 0.7 mm.

Further, the best suited barrier tip is described.

Figure 9:
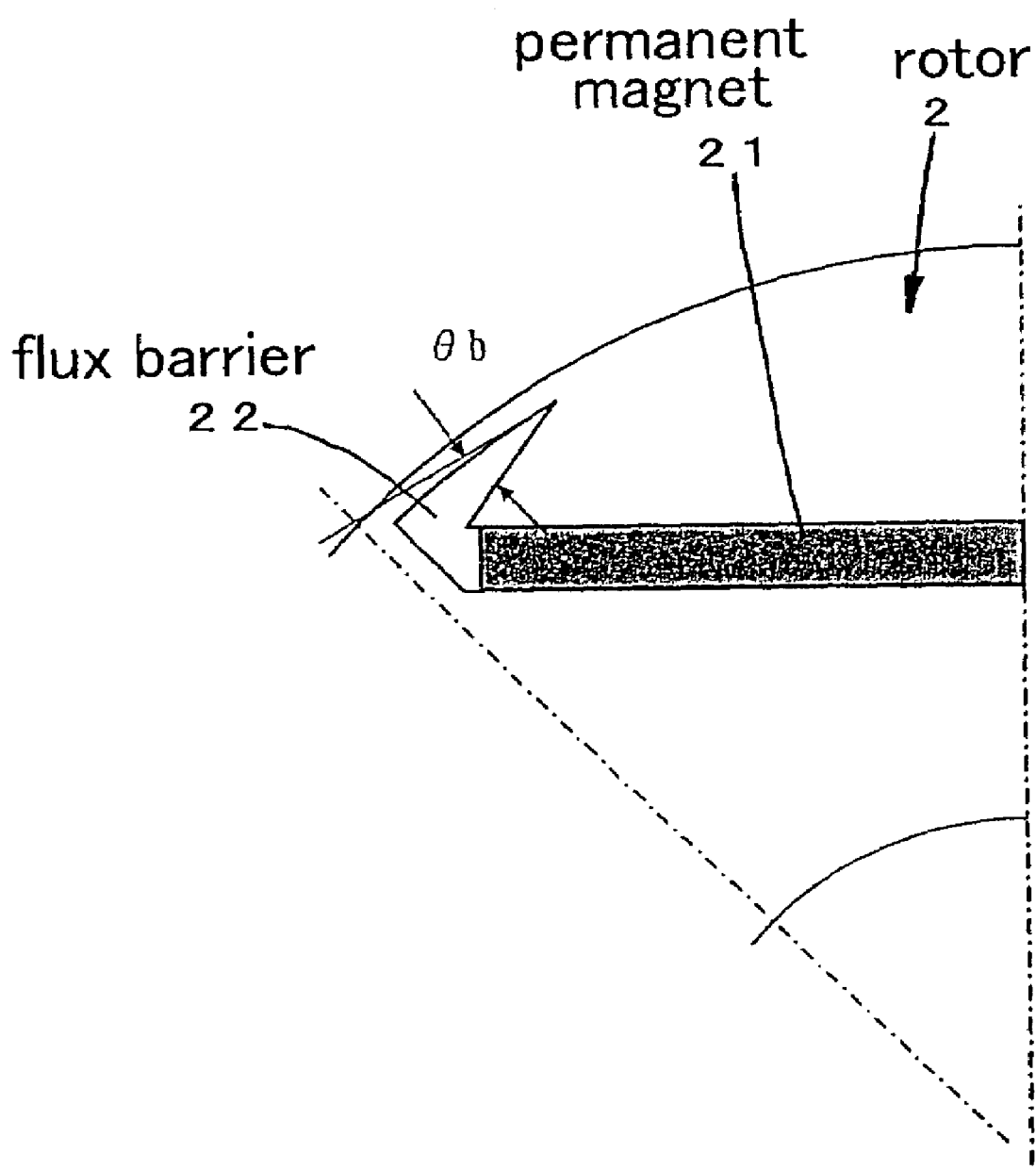
FIG. 9 is a vertical cross sectional view illustrating one flux barrier of the rotor illustrated in FIG. 5 in an enlarged condition.

The inventor has found that an angle (refer to θ$_b$ in FIG. 9) at the leading edge of the barrier 22 on magnetic pole center side affects exciting force and torque ripple, and that there exists the best suited angle which minimizes the exciting force and the torque ripple.

Figure 10:
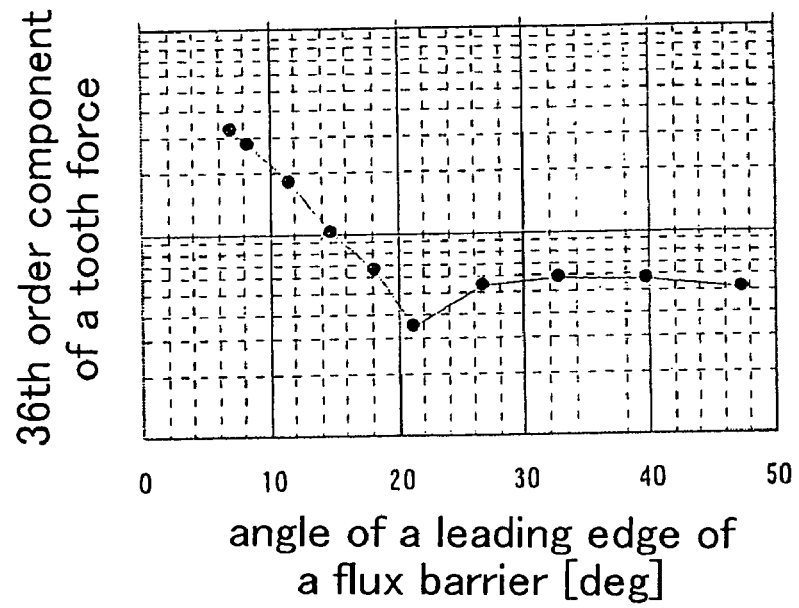
FIG. 10 is a diagram illustrating 36th order component of the stator tooth force with respect to an angle of a leading edge of a flux barrier.
Figure 11:
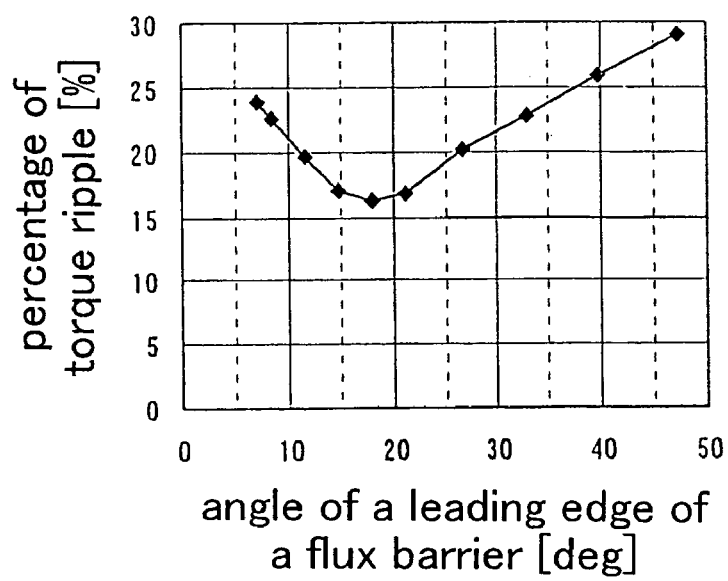
FIG. 11 is a diagram illustrating torque ripple with respect to an angle of a leading edge of a flux barrier.

The change of exciting force in 36th order (=f/f$_0$) when θ$_b$ is changed, is the change illustrated in FIG. 10. It is understood that the best suited value exists in the vicinity of 20° (exciting force is the smallest). On the greater angle side, saturation trend is represented with respect to a certain value. As a result, although it may be thought that any angle may be employed, generation torque ripple is minimized at about 20° and exhibits increasing trend following the increase in θ$_b$, as is illustrated in FIG. 11. Therefore, it is preferable that θ$_b$ is determined within an extent of 18°~25°.

Figure 12:
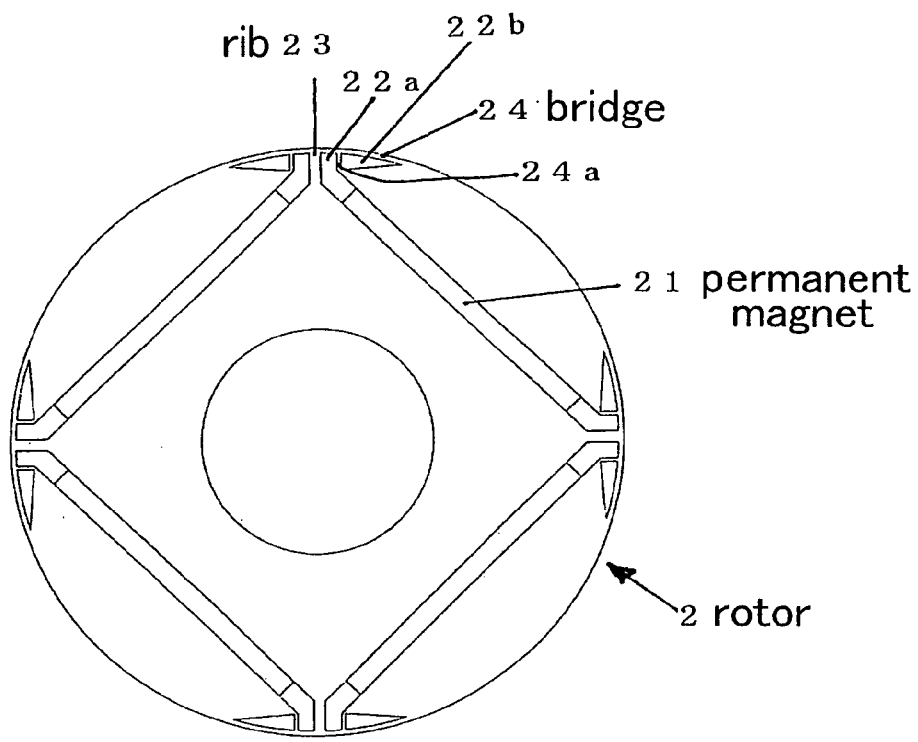
FIG. 12 is a vertical cross sectional view of a rotor of a brushless DC motor, the rotor being added a reinforcement bridge section.
Figure 13:
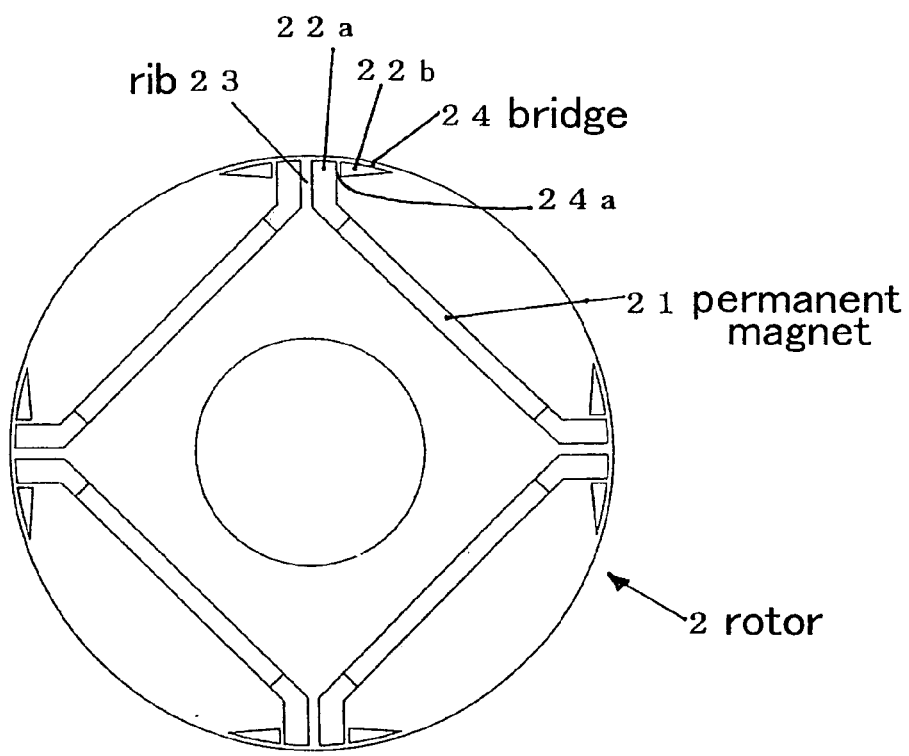
FIG. 13 is a vertical cross sectional view of a rotor of a brushless DC motor, the rotor being added a reinforcement bridge section, and a permanent magnet being disposed on the inner side.

When the length of the bridge 24 becomes longer, lowering in mechanical strength is worried. For this, it is exemplified that the flux barrier 22 is divided into a portion 22b circumferentially extending towards magnetic pole center and the other portion 22a, and that a core section for dividing the both portions 22a and 22b is made to be a reinforcement bridge section 24a so that mechanical strength is improved, as is illustrated in FIGS. 12 and 13. FIG. 13 has the same arrangement as that of FIG. 12 excepting that each permanent magnet 21 is disposed at the inner position for making the iron section outward with respect to the permanent magnet 21 so that q-axis inductance is not affected by magnetic saturation.

In the above brushless DC motor, it is preferable that a stator applied distributed winding is employed as the stator. The reason is that the distributed winding (refer to FIGS. 1 and 3) is an arrangement which originally has smaller vibration than that of the concentrated winding. Therefore, vibration can be reduced by increasing the number of slots, but further reduction in vibration is realized by utilizing the present invention.

The brushless DC motor is not limited to the brushless DC motor having the above arrangement.

Figure 14:
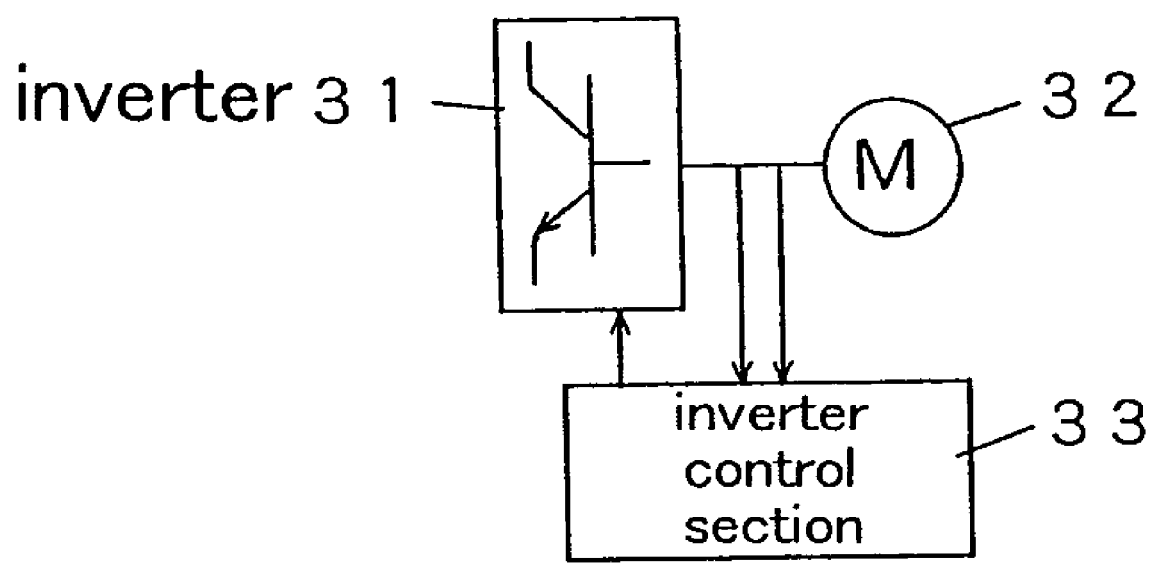
FIG. 14 is a block diagram illustrating a brushless DC motor control apparatus of an embodiment according to the present invention.

FIG. 14 is a block diagram illustrating a brushless DC motor control apparatus of an embodiment according to the present invention.

In the brushless DC motor control apparatus, output from an inverter 31 is supplied to a brushless DC motor 32, the inverter 31 receiving a DC power. The brushless DC motor control apparatus comprises a position detection section and an inverter control section 33.

The position detection section receives a motor voltage and a motor current, and estimates a magnetic pole position of a rotor of a brushless DC motor 32 using a previously determined motor model.

The inverter control section 33 carries out speed detection processing, speed control operation processing, phase control operation processing, current control operation processing and the like by making the estimated position signal to be a standard, and supplies switching commands for switching devices to the inverter 31. An arrangement of the inverter control section 33 is known from the past, therefore detailed arrangement is omitted.

The inverter control section 33 controls the inverter 31 so as to advance the motor current phase with respect to the motor induction voltage. In this case, the reluctance torque is effectively utilized.

The motor terminal voltage at maximum revolution can be determined to be equal to or greater than the output voltage of the inverter. In this case, driving of the brushless DC motor can be realized by carrying out flux weakening control.

The above inverter control section 33 estimates the magnetic pole position of the rotor without using a position sensor, therefore the brushless DC motor can easily be installed under severe circumstance such as a compressor so that the compressor and the like can be driven.

What is claimed is:

1. A brushless DC motor comprising:
   a stator; and
   a rotor comprising a plurality of permanent magnets each having a predetermined thickness and being mounted in an interior of the rotor, a plurality of flux bafflers made of non-magnetic sections, each of flux bafflers beginning from an edge section in circumferential direction of one of the permanent magnets, extending up to vicinity in a surface of the rotor, and having a length in a circumferential direction which is greater than a thickness of the permanent magnets, and a rib which is disposed between magnetic poles,
   the flux bafflers are configured and arranged such that an angle θ$_0$ between an edge section of the flux baffler on a magnetic pole center side and an edge section on a side for coming in contact with the rib of an adjacent one of the flux bafflers, with respect to a rotor center, is determined to be equal to or greater than an angle satisfying a following relationship θ$_0$=180°*m/(Pn*(f/f$_0$)), where 2θ$_0$−θ$_r$<90°, wherein, a frequency of vibration which is to be reduced is represented with f, a pole pair number is represented with Pn, an electrical frequency is represented with f$_0$=Pn*N, a motor revolution is represented with N, m is equal to an odd number and an angle of the rib with respect to the rotor center is represented with θr.

2. The brushless DC motor as set forth in claim 1, wherein the frequency f is determined so that f/f$_0$ is an even number.

3. The brushless DC motor as set forth in claim 1, wherein the frequency f is determined so that $f/f_0$ corresponds to multiplication of an integer and a stator slot number/Pn.

4. The brushless DC motor as set forth in claim 1, wherein m is determined so that the angle $\theta_0$ is equal to or greater than $(30/Pn)°$ and equal to or less than $(60/Pn)°$.

5. The brushless DC motor as set forth in claim 1, wherein the rib has a width that is equal to or greater than twice of a thickness of a bridge.

6. The brushless DC motor as set forth in claim 1, further comprising
a reinforcement bridge for reinforcing a bridge.

7. The brushless DC motor as set forth in claim 1, wherein the flux barriers have a shape on the magnetic pole center sides, with the shape being decreasing gradually in a radial direction, and an angle $\theta_b$ of a radial direction gradually decreasing shaped section that is equal to or greater than 18° and equal to or less than 25°.

8. The brushless DC motor as set forth in claim 1, wherein the stator has a stator slot number of 36, and the pole pair number Pn is 2, $f/f_0$ is 36, m is 7, respectively.

9. The brushless DC motor as set forth in claim 1, wherein the rotor employs a rotor applied skew.

10. The brushless DC motor as set forth in claim 1, wherein
the stator employs a stator applied distributed winding.

11. A brushless DC motor control apparatus comprising:
a brushless DC motor; and
an inverter device which is controlled to advance a current phase with respect to an induction voltage of the brushless DC motor,
the brushless DC motor comprising
a stator; and
a rotor comprising a plurality of permanent magnets each having a predetermined thickness and being mounted in an interior of the rotor, a plurality of flux barriers made of non-magnetic sections, each of flux barriers beginning from an edge section in circumferential direction of one of the permanent magnets, extending up to vicinity in a surface of the rotor, and having a length in a circumferential direction which is greater than a thickness of the permanent magnets, and a rib which is disposed between magnetic poles,
the flux barriers are configured and arranged such that an angle $\theta_0$ between an edge section of the flux barrier on a magnetic pole center side and an edge section on a side for coming in contact with the rib of an adjacent one of the flux barriers, with respect to a rotor center, is determined to be equal to or greater than an angle satisfying a following relationship $\theta_0 180°*m/(Pn*(f/f_0))$, where $2\theta_0-\theta_r<90°$), wherein, a frequency of vibration which is to be reduced is represented with f, a pole pair number is represented with Pn, an electrical frequency is represented with $f_0=Pn*N$, a motor revolution is represented with N, m is equal to an odd number and an angle of the rib with respect to the rotor center is represented with θr.

12. The brushless DC motor control apparatus as set forth in claim 11, wherein
the brushless DC motor and the inverter are configured such that a motor terminal voltage at a maximum revolution is determined to be equal to or greater than a voltage of the inverter.

13. The brushless DC motor control apparatus as set forth in claim 11, further comprising
a control section configured to calculate a rotor position using a voltage applied to the motor, a motor current, and equipment constants of the motor, and control the inverter device based upon the calculated rotor position for controlling a motor driving current or a voltage applied to the motor.

14. The brushless DC motor control apparatus as set forth in claim 13, wherein
the brushless DC motor drives a compressor.

* * * * *